United States Patent [19]

Guillon

[11] Patent Number: 5,305,552
[45] Date of Patent: Apr. 26, 1994

[54] METAL ARMATURE FOR A TIGHT STRIP OR A SEAL, FOR USE, IN PARTICULAR, IN THE AUTOMOTIVE INDUSTRY

[75] Inventor: Henri Guillon, St Maurice sur Fessard, France

[73] Assignee: Hutchinson, Paris, France

[21] Appl. No.: 579,520

[22] Filed: Sep. 7, 1990

[30] Foreign Application Priority Data

Sep. 13, 1989 [FR] France ............... 89 11955

[51] Int. Cl.$^5$ ............................................ E06B 7/16
[52] U.S. Cl. .................................. 49/490.1; 49/440
[58] Field of Search ............... 49/440, 441, 488, 490, 49/491, 475.1; 428/122, 358

[56] References Cited

U.S. PATENT DOCUMENTS

| | | | |
|---|---|---|---|
| 1,967,514 | 7/1934 | Reid | 49/441 |
| 3,706,628 | 12/1972 | Azzola | 428/35 P X |
| 4,196,546 | 4/1980 | Bright | 49/490 |
| 4,271,634 | 6/1981 | Andrzejewski | 49/441 X |
| 4,304,816 | 12/1981 | Bright et al. | 49/490 X |
| 4,610,907 | 9/1986 | Elvira | 49/440 X |

FOREIGN PATENT DOCUMENTS

| | | | |
|---|---|---|---|
| 2817716 | 11/1978 | Fed. Rep. of Germany | 49/491 |
| 2033026 | 11/1970 | France . | |
| 2258514 | 8/1975 | France . | |
| 45-19847 | 5/1970 | Japan | 49/491 |
| 460261 | 1/1937 | United Kingdom | 49/441 |
| 2022180 | 12/1979 | United Kingdom | 49/491 |

*Primary Examiner*—Peter M. Cuomo
*Assistant Examiner*—Jerry Redman
*Attorney, Agent, or Firm*—Browdy and Neimark

[57] ABSTRACT

Metal armature for a tight strip or a seal, for use in particular in the automotive industry and specially for the production of members such as guides, slides, pane bottom or car window wiper rings ... etc, having a U-shape in its operational condition and comprising of sequence of elements arranged at intervals and connected with each other, each element, being composed of two nearly parallel strips joined by means of spacers and two adjacent elements being connected to each other using a connecting strip. The spacers and connecting strips are slanted to the mean longitudinal direction of the armature yet with opposite angles. The armature is for use in particular in the automotive industry and especially for the production of elements such as guides, slides, pane bottom or car window wiper rings.

6 Claims, 2 Drawing Sheets

METAL ARMATURE FOR A TIGHT STRIP OR A SEAL, FOR USE, IN PARTICULAR, IN THE AUTOMOTIVE INDUSTRY

BACKGROUND OF THE INVENTION

1. Field of the Invention

The invention relate% to a metal armature for a tight strip or a seal for use in particular in the automotive industry and especially for the production of guides, slides, pane bottom or car window . . . etc, as well as to seals such as guides, slides, wiper rings . . . etc including such armatures.

2. The Prior Art

An armature is already known from FR-A 2 435 644 for such tight strips or seals, which is composed of a series of adjacent elements connected with each other by means of short connecting strips, other designs being known, for example, from FR-A 2 389 052, FR-A 2 352 942, FR-A 2 033 026, FR-A 2 258 514 or EP-A 0 252 659, . . . etc. However, these known armatures are not quite satisfactory because, on the one hand, their compressibility is extremely low and, on the other hand, they are subject to prohibitive elongation if the tensile stress is not directed along a predetermined direction.

Now, the rationalizing requirements regarding the seal mounting operations, as well as those concerning slides, wiper rings, . . . etc, have led car manufacturers to give up the cutting of the seal after fitting for the exclusive use of seals, slides, wiper rings precut to the required length, which are compression positioned which, besides a more reasonable cost, offers the advantage of a better adherence of the seal or guide to the window mount.

The object of the invention is to provide an armature of the aforesaid type, without the disadvantages of the known types, and which has good tension-compression properties with a high compressibility level and a low extensibility level as compared with compressibility, while being easily and inexpensive constructed.

SUMMARY OF THE INVENTION

Therefore, the object of the invention is a metal armature for a tight strip or a seal for use in particular in the automotive industry and especially for the production of parts such as guides, slides, pane bottom or car window, wiper rings . . . etc, which is U-shaped in its operational condition and comprises a sequence of elements arranged at intervals and connected with each other, each elemenent being composed of two nearly parallel strips joined by means of spacers, two adjacent elements being connected with each other using a connecting strip arranged approximately near the median parts of the strips, characterized in that the spacers and connecting strips are slanted with respect to the mean longitudinal direction of the armature, but, however with opposite angles.

In a preferred embodiment of the invention, a first spacer connecting two strips making up an element is provided between the end of a first strip and an intermediate zone of a second strip, the second spacer connecting said both element strips being provided between an end of the second strip and an intermediate zone of the first strip.

In a plane view, and before the armature is U-shaped in order to be inserted in the tight strip, seal, guide, slide, wiper ring . . . etc, for which it is intended, each element made up of two parallel strips and spacers connecting said strips has somewhat a two-N pattern, whose legs are side by side and have a pinpoint symmetry about a point of the mean longitudinal plane of the armature.

In a preferred embodiment, the angle formed by spacers and strips is in the order of 30° and it is an angle of the same value, but with the opposite slant, which is present between the connecting strips and the strips of two adjacent elements.

A further object of the invention is a blank made up of metal or any other material with similar mechanical properties, in particular as regards the tension-compression and bending properties, and which is shaped in a manner to form, after bending, an armature as defined above, which looks like pairs of strips connected with each other by means of spacers so as to form elements connected with each other using connecting strips parallel to each other, characterized in that said spacers, which are parallel to each other, are slanted with regard to that longitudinal direction, but in the opposite direction to the spacers.

In accordance with a characteristic of the invention, said strips have an approximately rectangular plane contour and the angles of the connecting strips to the mean longitudinal axis of the blank is preferably in the order of 30°.

A further object of the invention is a tight strip or seal, for use in particular in the automotive industry, such as a slide, a pane bottom wiper ring . . . etc comprising a metal armature as defined above.

Figure 1:
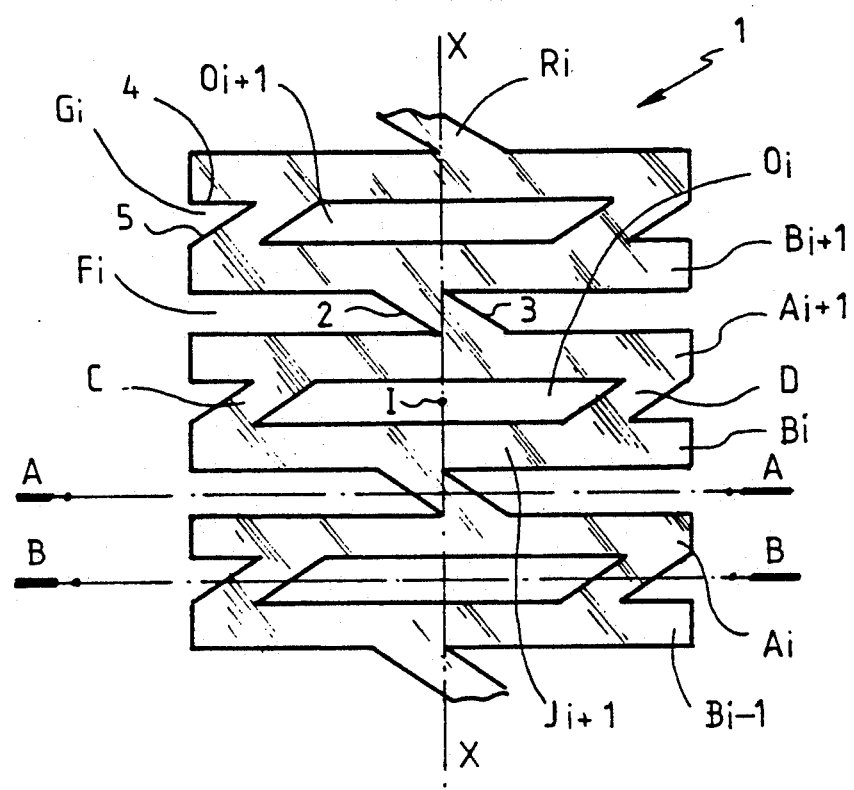
FIG. 1 is a plane view of an armature blank for a seal according to the invention.
Figure 2A:
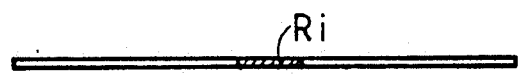
FIGS. 2a and 2b are cross-sectional view taken from two parallel plans a—a and b—b of the armature shown in FIG. 1.
Figure 2B:
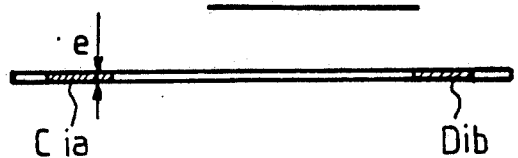
Figure 3:
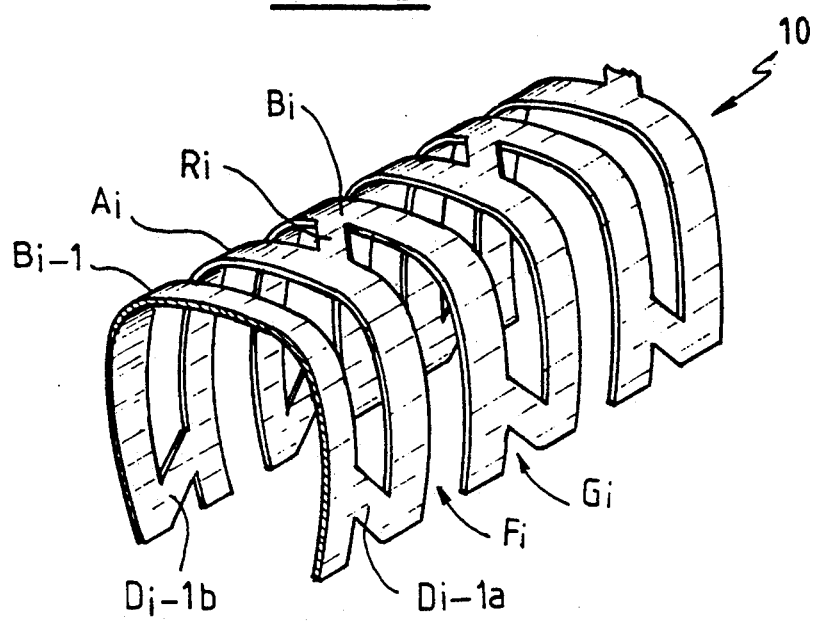
FIG. 3 is a perspective view of the metal armature alone, shaped before being inserted in a seal.
Figure 4:
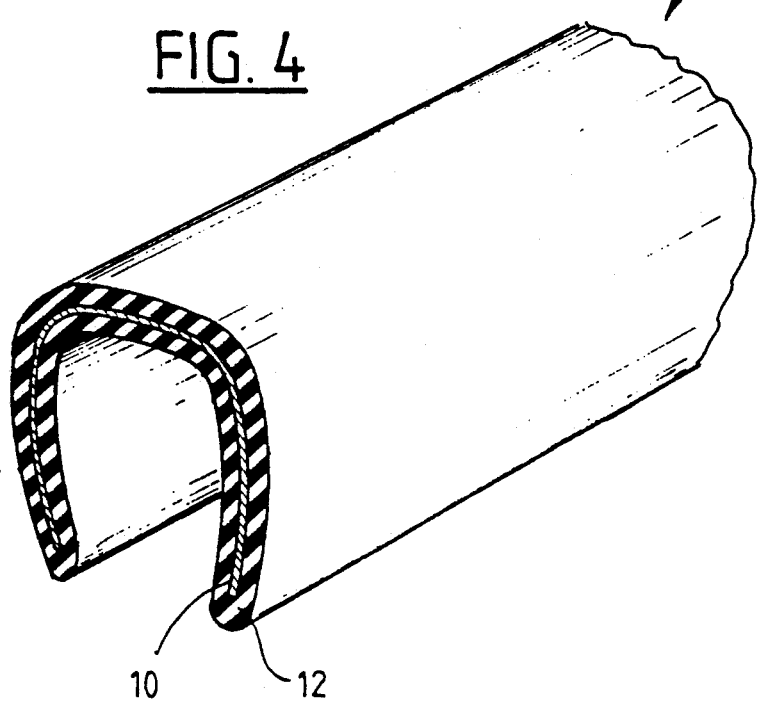
FIG. 4 is a schematic perspective view of a metal-armature sealing according to the invention.

Other features of the invention will be apparent from the following description, by way- of example, with reference to the accompanying drawings, wherein:

FIG. 1 is a plane view of an armature blank for a seal according to the invention;

FIGS. 2A and 2B are cross-sectional views taken from two parallel plans A—A and B—B of the armature shown in FIG. 1;

FIG. 3 is a perspective view of the metal armature alone, shaped before its being inserted in a seal;

FIG. 4 is a schematic perspective view of a metal-armature seal according to the invention.

DETAILED DESCRIPTION OF THE INVENTION

First, FIG. 1 shows a blank or a sheet, made of metal or any other material exhibiting, similar mechanical properties, referred to as a whole as 1, with a small thickness e designed to form, after U bending about two axes parallel to the XX line of its plane of symmetry and symmetrically about it, the armature shown in FIGS. 3 and 4. The blank 1 of the invention, produced, for example by stamping or using a blanking press, from a solid sheet, is shaped as illustrated in FIG. 1, that is to form:

pairs of metal trips, $A_i$, $B_i$, ($i=1, 2 \ldots u$) extending perpendicular to axis XX, with an overall rectangular contour in a plane view;

a first series of spacers parallel to each other, $C_i$, with an angle of about 30° to strips A, B, and connecting two strips A and B to make up a pair;

a second series of spacers, $D_i$, parallel to each other, with the same angle to strips A, B, as spacers $C_i$, and also connecting two strips A and B to form a pair; and connecting strips, parallel to each other, also with an angle of about 30° to strips A and B, but in the opposite direction to that of spacers C and D, the connecting strips R connecting the strip $B_i$ of a element made up of a pair of strips A, B to the strip $A_{i+1}$ of the adjacent element in the sequence of elements.

As is well seen in FIG. 1, the connecting strips $R_i$ connect the strips of two adjacent elements approximately in the median zone of said strips, whilst spacers C and D connect strips A and B of a same element by their being provided between the end of a first strip $B_i$ and an intermediate zone of a second strip $A_{i+1}$ and between an end of the second strip $A_{i+1}$ and an intermediate zone of the first strip $B_i$.

In a plane view, and before the armature is U-shaped in order to be inserted in the tight strip, seal, guide, slide, wiper ring, ... etc, as will be described in detail hereinafter, each element made up of two strips $A_{i+1}$ and $B_i$ has somewhat a two-N pattern, whose legs $J_i$ and $J_{i+1}$ are side by side and with a pinpoint symmetry about a point I of the mean longitudinal plane XX of the armature—to this definition of the armature construction on the basis of the solid elements of blank 1, also corresponds a definition based on the recesses formed by openings $O_i$ ($i=1,2 \ldots$) arranged at regular intervals along axis XX, and in the shape of parallelograms elongated in direction perpendicular to axis XX, and the larger sides of which are perpendicular to axis XX, the smaller sides forming an angle of about 30° to the larger sides : besides these openings, blank 1 also comprises:

a first series of pairs of indentations or slots, $F_i$, arranged parallel to openings $O_i$, and having the shape of right-angled trapeziums opening on to the longitudinal edges of the blank and which are bounded by the parallel sides 2 and 3 of connecting strips $R_i$, a second series of pairs of identations $G_i$, in the shape of right-angled triangles, smaller in height than identations $F_i$ and which open on to the longitudinal edges of the blank, whilst being each bounded by a side 4 of a strip A and B—thus perpendicular to the direction of axis XX—and a side 5 of the spacer C or D.

For the fabrication of an armature 10, FIG. 3, from the blank illustrated in FIGS. 1 and 2, said blank is bent to a general U-profile, so that if the connecting strips $R_i$ remains parallel to each other, both spacers $C_i$ and $D_i$ of one element are now located in planes parallel to the plane of symmetry of the armature and antiparallel with regard to a plane parallel to the U-base.

For the fabrication, from the armature 10, of a seal 11, schematically illustrated in FIG. 4, which may be a guide, a car window guide slide, a pane bottom wiper ring, ... etc, the armature 10 is then coated with rubber or another elastomer or a compound of elastomeric materials, generally and most simply using an extrusion process or a similar known process which therefore is not described here.

A seal according to the invention, fabricated using the armature described hereinabove, can be compressed on fitting so that this mounting operation can be carried out by positioning first, on the window mount for which the seal is intended, both seal ends cut to a length slightly greater than the window periphery length, and then by turning into account the compression allowed of by the armature for the final positioning. The presence of slant connecting strips and spacers, which make the armature more easily compressed than elongated, ensure a satisfactory fitting which does not require any further operations and at the end of which the seal quite satisfactorily takes the exact shape of the window mount even if the latter shows small bending radii.

I claim:

1. Metal armature blank for a tight strip or seal, for use in the automotive industry for production of guides, slides, pane bottom or window car wiper rings, having a U shape in its operational condition and comprising a sequence of elements arranged at intervals and connected with each other, each element being composed of two nearly parallel strips joined by means of spacers and two adjacent elements being connected with each other using a connecting strip arranged approximately near median parts of the strips, wherein the spacers and the connecting strips are slanted with respect to a mean longitudinal direction of the armature but with opposite angles wherein the first spacer connecting two strips making up an element is provided between an end of a first strip and an intermediate zone of a second strip whilst a second spacer of said element is provided between an end of the second strip and an intermediate part of the first strip.

2. Metal armature blank according to claim 1, wherein, in a plane view, and before shaping, the blank has a two N pattern, legs having side by side and a pinpoint symmetry about a point of a mean longitudinal plane of the blank.

3. Metal armature blank according to claim 2, wherein the angles formed by the connecting strips and spacers to a longitudinal axis of the armature are in the order of 30°.

4. Blank made up of metal or any other material with similar mechanical properties, as regards tension-compression and bending properties and which is shaped, after bending, to form an armature according to claim 1.

5. A blank according to claim 4, wherein said strips have an approximate rectangular plane contour, and wherein angles of the connecting strips to a mean longitudinal axis of the blank are approximately 30°.

6. A strip or seal for use in the automotive industry to provide a guide, a slide, a pane bottom or car window wiper ring, wherein said strip or seal comprises an armature blank according to claim 1.

* * * * *